(12) United States Patent
Kita et al.

(10) Patent No.: US 7,175,756 B2
(45) Date of Patent: Feb. 13, 2007

(54) DEVICE FOR TREATING WORKING FLUID FOR ELECTRIC DISCHARGE MACHINING

(75) Inventors: Yuki Kita, Minamitsuru-gun (JP); Yushi Takayama, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 377 days.

(21) Appl. No.: 10/902,379

(22) Filed: Jul. 30, 2004

(65) Prior Publication Data
US 2005/0023195 A1    Feb. 3, 2005

(30) Foreign Application Priority Data
Jul. 31, 2003    (JP)    ............... 2003-284262

(51) Int. Cl.
*B01D 17/12* (2006.01)
*B23H 7/36* (2006.01)
(52) U.S. Cl. .................. 210/86; 210/121; 210/143; 210/168; 210/171; 210/258; 417/211.5
(58) Field of Classification Search .................. 210/86, 210/121, 143, 258, 168, 171; 417/211.5
See application file for complete search history.

(56) References Cited

U.S. PATENT DOCUMENTS 6,485,634 B2 * 11/2002 Warren et al. ................ 210/85
2002/0134759 A1    9/2002 Kita et al.

FOREIGN PATENT DOCUMENTS

| EP | 1 243 372 A2 | 9/2002 |
|----|---|---|
| EP | 1243372 A2 | 9/2002 |
| JP | 6-32259 | 8/1994 |
| JP | 7-41512 | 5/1995 |
| JP | 8-1443 | 1/1996 |
| JP | 2002-283146 | 10/2002 |

OTHER PUBLICATIONS

Patent Abstracts of Japan, JP 08001443 A, Working Liquid Processing Device For Electric Discharge Machine, vol. 1996, No. 5, May 1996.
Patent Abstracts of Japan, JP 03121725 A, Electric Discharge Machining Liquid Supplying Device, vol. 15, No. 321, Aug. 1991.
Patent Abstracts of Japan, JP 11048040 A, Method and Device for Wire Type Electric Discharge Machine, vol. 1999, No. 5, May 1999.

* cited by examiner

*Primary Examiner*—Terry K. Cecil
(74) *Attorney, Agent, or Firm*—Drinker, Biddle & Reath LLP

(57) ABSTRACT

The device for treating working fluid includes a fluid level detecting device for detecting a fluid level of cleaned fluid in a cleaned fluid tank, and a control unit for determining an adjustment value for a discharge rate command for a filter device pump, based on the fluid level detected by the fluid level detecting device. The control unit operates to determine a renewed discharge rate command by adding the adjustment value thus determined to the present discharge rate command, and to output the renewed discharge rate command to a pump controller. The pump controller drives the filter device pump according to the discharge rate command to transfer the working fluid from the polluted fluid tank to the cleaned fluid tank through the filter device.

10 Claims, 5 Drawing Sheets

| i | DISCHARGE RATE ADJUSTMENT VALUE |
|---|---|
| 1 | $\Delta Q1$ |
| 2 | $\Delta Q2$ |
| 3 | $\Delta Q3$ |
| ⋮ | ⋮ |
| N | $\Delta Qn$ |
| N+1 | $\Delta Qn+1$ |

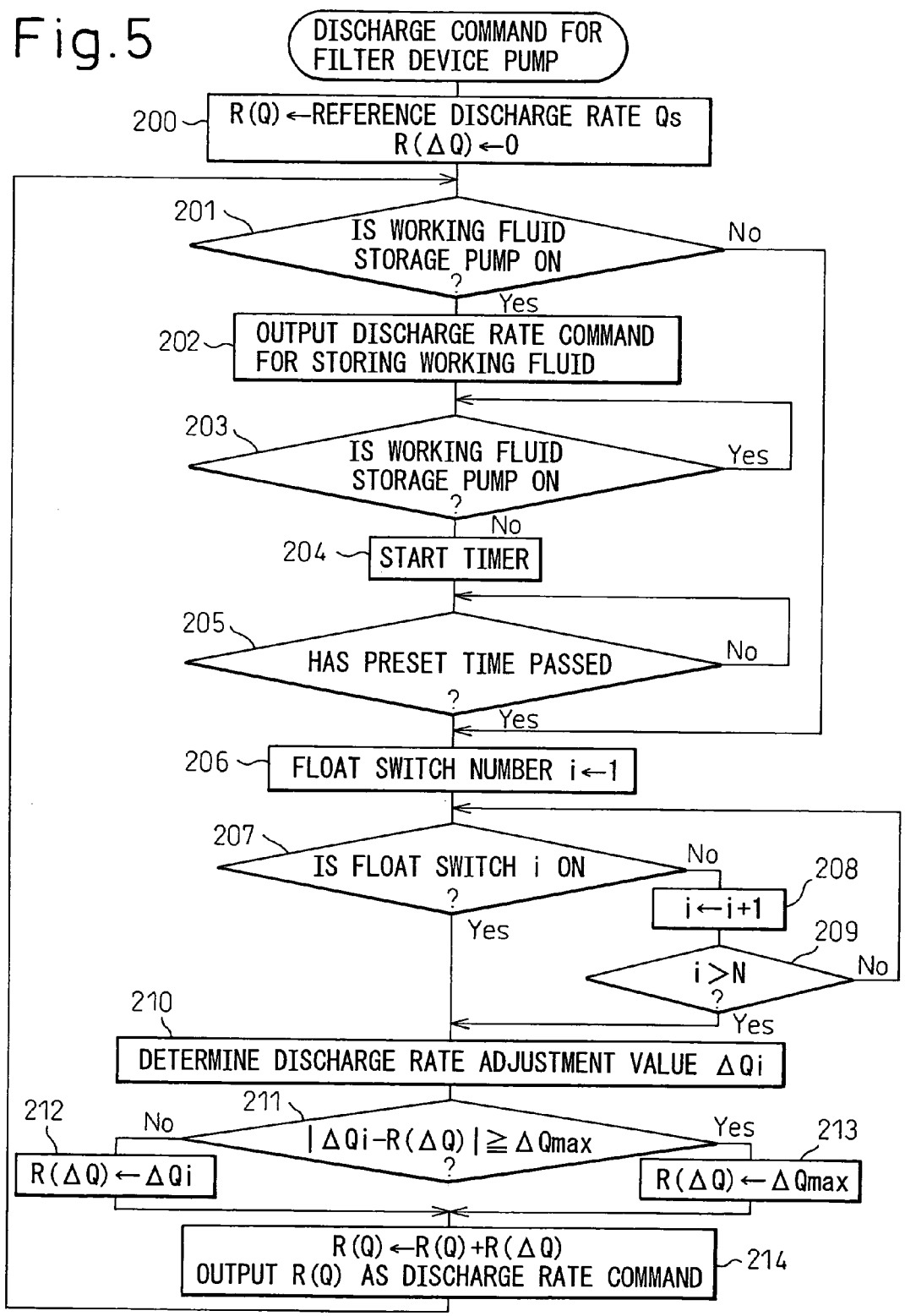

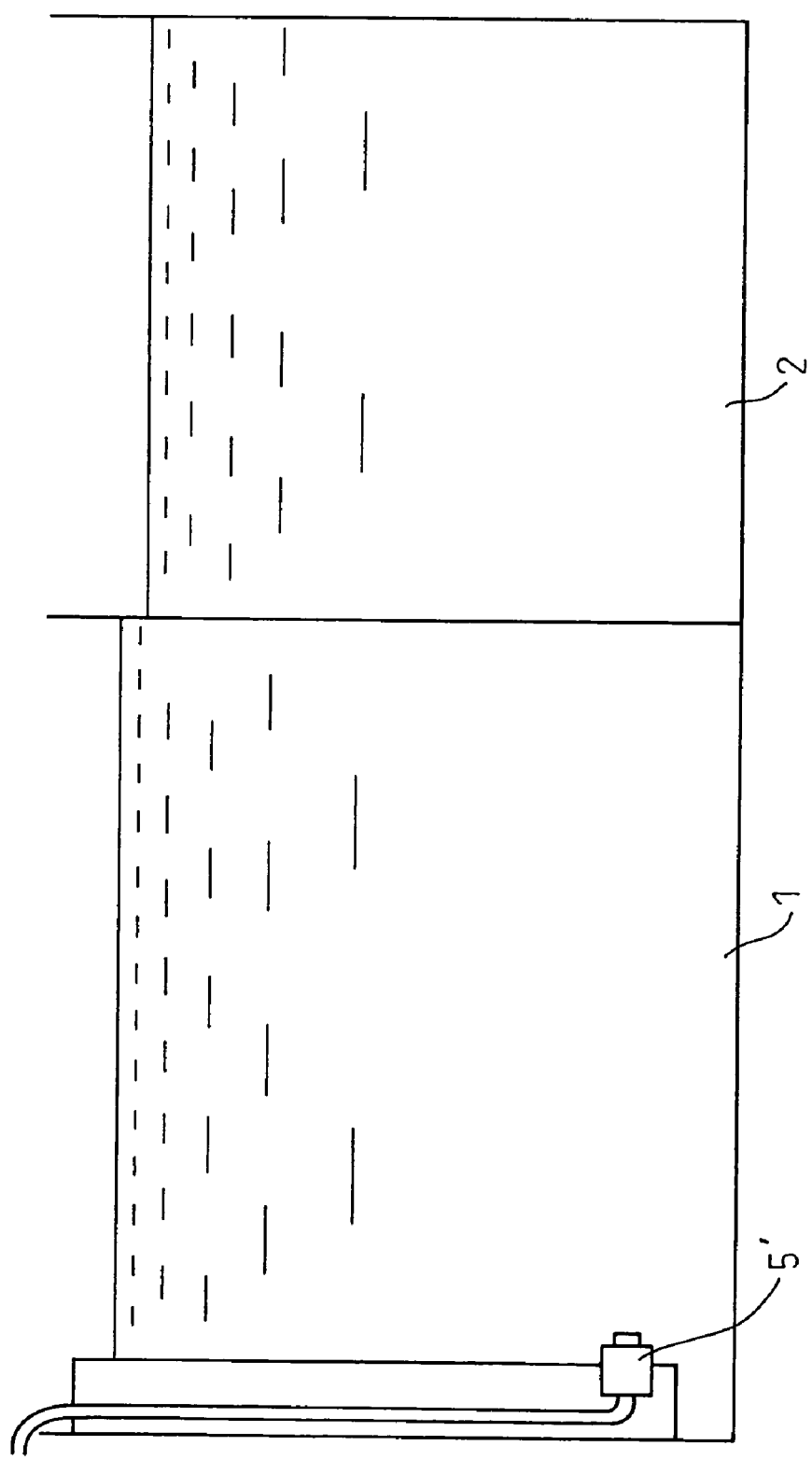

DEVICE FOR TREATING WORKING FLUID FOR ELECTRIC DISCHARGE MACHINING

BACKGROUND OF THE INVENTION

1. Field of the Invention

The present invention relates to a device for treating working fluid for electric discharge machining, which is used in a wire electric discharge machine or the like.

2. Description of the Related Art

In wire electric discharge machining for machining a workpiece by applying electric voltage between a wire electrode and the workpiece thereby to generate electric discharge between the two, a part of the workpiece is removed from the workpiece due to the electric discharge phenomenon, and this generates machining waste. Similarly, in the die-sinking electric discharge machining, machining waste is also generated. These waste are in a micro-powder form peculiar to the electric discharge machining, and are generally referred to as sludge. Further, during the electric discharge machining, an electrode is worn to generate a micro-waste of the electrode such as wire waste.

In the wire electric discharge machine, for the purpose of cooling the machining area in a machining tank, a working fluid (water, oil or the like) is ejected from upper and lower guide portions for guiding a wire electrode toward a machining area during the wire electric discharge machining. The ejected working fluid is collected, as polluted fluid containing the above-mentioned sludge and is wire waste, from the machining tank into a polluted fluid tank of a device for treating the working fluid, and is then transferred from the polluted fluid tank to a filter device by means of a filter device pump. The polluted fluid becomes a cleaned fluid by using a filtering member in the filter device to filter the sludge and the wire wastes from the polluted fluid, and the cleaned fluid thus obtained is stored in a cleaned fluid tank. The cleaned fluid stored in the cleaned fluid tank is supplied again to the upper and lower wire guide portions and ejected to the machining area, as working fluid for the wire electric discharge machining. In such a manner, the working fluid circulates from the wire electric discharge machining area, through the polluted fluid tank and the cleaned fluid tank, back to the wire electric discharge machining area, so that it is repeatedly used.

The filtering member in the filter device is made of filter paper of a mesh structure, so that the sludge and the wire waste contained in the polluted fluid are caught by the mesh structure of the filter paper and removed from the polluted fluid when the polluted fluid passes through the filter device. Further, the sludge and wire waste caught by the filter paper, if they are deposited on the filter paper, form a kind of mesh structure, which also may catch the sludge and wire waste. As a result, only the cleaned fluid can pass through the mesh structure of the filter paper itself as well as the mesh structure formed by the sludge and wire waste piled together. Thus, the polluted fluid is taken out, as cleaned fluid, from the filter device and flows into the cleaned fluid tank.

However, when the flow speed of the polluted fluid flowing into the filter device is larger than a predetermined value, the sludge and the wire waste reach the mesh of the filter paper at high speed and enter into the mesh to cause an early clogging. Also, the sludge and wire waste do not form a mesh structure on the mesh structure of the filter paper with suitable gaps maintained therein, but deposits on the mesh surface of the filter paper in a dense state so as to stick to the mesh surface, whereby the working fluid hardly passes through it. If the filter device is in this state, the filtration capacity of the filter device rapidly deteriorates and the filter paper (or the filtering member) reaches the end of its life earlier.

Japanese Unexamined Patent Publication No. 2002-283146 discloses a working fluid treatment device for a wire electric discharge machine, in which a hydraulic pressure sensor for sensing a filtration hydraulic pressure is provided between a filter pump and a filtering member to determine the degree of the clogging of the filter, in order to detect the end of the life of the filtering member.

Japanese Unexamined Patent Publication No. 8-1443 discloses a working fluid treatment device for an electric discharge machine, in which polluted fluid is taken out from a polluted fluid tank by a working fluid circulation pump, cleaned by a filter device, and supplied to a cleaned fluid tank, and in which a flow rate of the cleaned fluid supplied from the cleaned fluid tank to the electric discharge machining area is sensed thereby to control a flow rate of the working fluid returned to the cleaned fluid tank by the working fluid circulation pump so as to be slightly larger than the sensed flow rate of the cleaned fluid supplied to the electric discharge machining area.

Similarly, another type of electric discharge machine is also known in which a flow rate of cleaned fluid supplied to an electric discharge machining area is sensed and a target value is determined to be equal to or slightly larger than the sensed value of the flow rate, so that a discharge rate of a filter pump for delivering the working fluid from a polluted fluid tank to a filter is feedback-controlled to be slightly larger than a flow rate of the working fluid supplied to the electric discharge machining area. Also, Japanese Examined Patent Publication No. 7-41512 proposes a method for controlling the filtration of working fluid in the above case, in which pressure is sensed instead of the flow rate and converted to the flow rate by a pressure/flow rate converting portion.

Further, Japanese Examined Utility Model Publication No. 6-32259 discloses a working fluid circulation device for an electric discharge machine, in which, for the purpose of preventing the heat generation from being caused by a constant operation of a pump for supplying working fluid from a discharged fluid tank (a polluted fluid tank) through a filter or the like to a supply fluid tank (a cleaned fluid tank), a fluid-level sensor is provided for detecting the increase of the fluid level of the discharged fluid tank (the polluted fluid tank) up to a predetermined level, or the decrease of the fluid level of the supply fluid tank (the cleaned fluid tank) down to a predetermined level, so that the pump is actuated when the fluid level of the supply fluid tank decreases down to the predetermined level, and the pump is stopped when a predetermined period passes after the start of the operation of the pump or when the fluid level of the discharged fluid tank increases to the predetermined level.

However, an object of the invention described in Japanese Unexamined Patent Publication No. 2002-283146 is to detect the end of the life of the filtering member to solve the above-described problem in which the filtration capacity of the filter device deteriorates rapidly and the life of the filtering member become shorter when the flow rate of the polluted fluid flowing into the filter device is larger than a predetermined value, but is not a countermeasure for prolonging the life of the filtering member.

In the inventions described in Japanese Unexamined Patent Publication No. 8-1443 and Japanese Examined Patent Publication No. 7-41512, the flow rate of the working fluid to be supplied to the filter device is controlled by controlling the flow rate of the polluted fluid delivered to the filter device so as to be slightly larger than the flow rate of the cleaned fluid supplied to the electric discharge machining area. However, the working fluid in the cleaned fluid tank is used not only as working fluid to be supplied to the electric discharge machining area during the machining operation, but also as supplementary fluid for maintaining the fluid level in the machining tank, as working fluid to be supplied to the working fluid cooling device, as working fluid to be supplied to an ion-exchange resin device for regulating the specific resistance of the working fluid, and furthermore as working fluid in a clean fluid tank for the automatic connection of wires. Accordingly, even if flow rate of the working fluid to be supplied to the electric discharge machining area is sensed and the working fluid is supplied to the filter device at a flow rate equal to or slightly larger than the detected working fluid flow rate to supply the cleaned fluid to the cleaned fluid tank, the working fluid in the cleaned fluid tank can still run short.

Further, in the invention described in Japanese Examined Utility Model Publication No. 6-32259, the fluid level in the supply fluid tank (the cleaned fluid tank) is controlled by actuating the filter device pump to supply the polluted fluid to the filter device when a fluid level sensor detects the decrease of the fluid level in the supply fluid tank (the cleaned fluid tank) down to a predetermined level, and stopping the filter device pump when a predetermined period passes over or the fluid level reaches a predetermined level. Accordingly, it is necessary to frequently repeat the actuation and stop of the filter device pump, which imposes an excessive load on a control board or a magnetic switch for controlling the filter device pump as well as the filter device pump itself.

SUMMARY OF THE INVENTION

Therefore, in order to solve the above-mentioned problems in the prior art, an object of the present invention is to provide a device for treating working fluid for the electric discharge machining, capable of maintaining a fluid level in a cleaned fluid tank at a proper level while preventing an excessive load from being imposed on a filter device pump and a control circuit thereof as well as avoiding the early clogging of a filtering member.

According to the present invention, there is provided a device for treating working fluid for electric discharge machining, in which a workpiece is machined by applying electric voltage between an electrode and the workpiece to generate electric discharge between the electrode and the workpiece, said device including a polluted fluid tank for collecting and storing the polluted working fluid used in the machining, a cleaned fluid tank for storing cleaned working fluid obtained by delivering the polluted working fluid from the polluted fluid tank to a filter device by means of a filter device pump and filtering the polluted working fluid, a working fluid supply pump for supplying the cleaned fluid from the cleaned fluid tank to an electric discharge machining area during the machining, and a pump controller for controlling a discharge rate of the filter device pump, wherein the device further includes fluid level detecting means for detecting a fluid level of the cleaned working fluid in the cleaned fluid tank, and a control unit for determining a discharge rate command for the filter device pump, based on the fluid level detected by the fluid level detecting means, the control unit outputting the determined discharge rate command to the pump controller, the pump controller controlling the filter device pump, based on the discharge rate command, to transfer the working fluid from the polluted fluid tank to the cleaned fluid tank through the filter device.

The fluid level detecting means may be a swing arm type of float switch, or may comprise a hydraulic pressure sensor and means for detecting a fluid level by converting the hydraulic pressure sensed by the hydraulic pressure sensor into a corresponding fluid level.

More preferably, the control unit operates to determine a discharge rate adjustment value, based on a difference between a predetermined reference fluid level and the fluid level detected by the fluid level detecting means, and to output a discharge rate command obtained by adding the discharge rate adjustment value thus determined to the discharge rate command at that time, as a renewed discharge rate command, to the pump controller.

Preferably, the fluid level detecting means includes a plurality of float switches disposed at different depth positions in the cleaned fluid tank so as to be capable of detecting stepwise a fluid level, and the control unit operates to determine the discharge rate command for the filter device pump based on the fluid level detected by the fluid level detecting means. In this case, the control unit more preferably operates to determine a discharge rate adjustment value corresponding to the detected fluid level by using discharge rate adjustment values, the respective discharge rate adjustment values predefined and stored in advance in correspondence to the respective fluid levels to be detected by the respective float switches, and to output a discharge rate command obtained by adding the discharge rate adjustment value thus determined to the discharge rate command at that time, as a renewed discharge rate command, to the pump controller.

Preferably, when the fluid level in the cleaned fluid tank is significantly lowered, the control unit operates to limit an increased amount of the discharge rate command for the filter device to prevent the discharge rate command from abruptly increasing.

In the above-mentioned device for treating working fluid for electric discharge machining, the electric discharge machine may be a wire electric discharge machine, or may be a die-sinking electric discharge machine.

The device for treating working fluid for electric discharge machining according to the present invention makes it possible to prevent the filtering member from being quickly clogged without imposing an excessive load on the filter device pump and the control circuit therefor. Also, even if the flow rate of the working fluid supplied to the cleaned fluid tank varies due to the clogging of the filter device, it is possible to maintain the fluid level in the cleaned fluid tank at the reference fluid level by changing the discharge rate command.

BRIEF DESCRIPTION OF THE DRAWINGS

The above and other objects, features and advantages will be described in more detail below based on the preferred embodiments with reference to the accompanying drawings, wherein:

FIG. 5 is a flow chart illustrating a control procedure for a filter device pump in the second embodiment; and FIG. 6 is a schematic view illustrating a fluid level detecting device which can be used in the second embodiment of the present invention, in which a hydraulic pressure sensor is used for detecting the fluid level.

DETAILED DESCRIPTION

The preferred embodiments of the present invention will be described in detail below with reference to the drawings.

Figure 1:
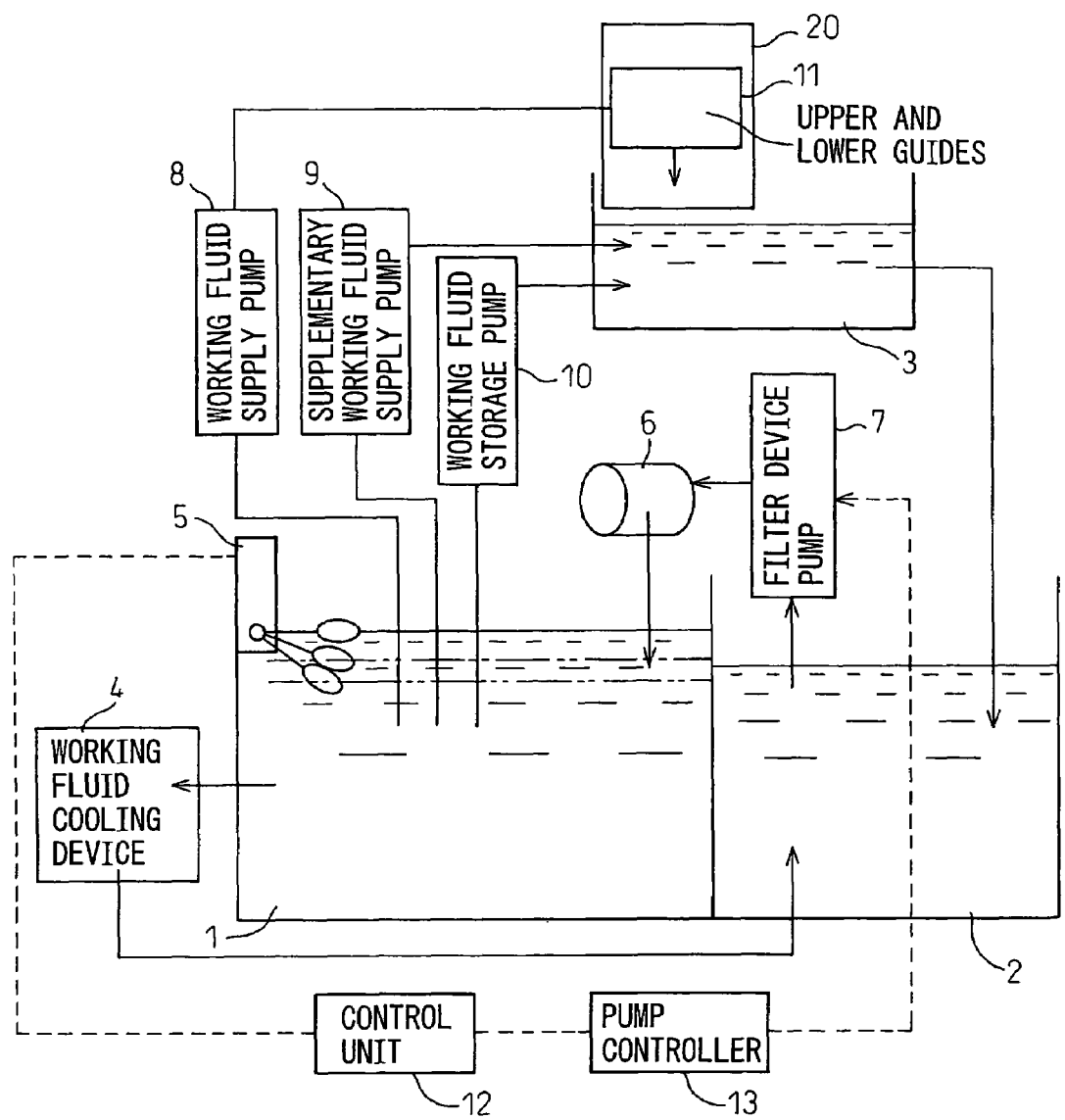
FIG. 1 is a block diagram of a first embodiment of the present invention.

FIG. 1 is a block diagram of a first embodiment of the present invention.

In FIG. 1, reference numeral 1 denotes a cleaned fluid tank, and reference 2 denotes a polluted fluid tank. In the cleaned fluid tank 1, a fluid level detecting device 5 is provided for detecting a fluid level of cleaned fluid stored therein. Polluted fluid in the polluted fluid tank 2 containing sludge and/or wire waste is pumped up by a filter device pump 7 and supplied to a filter device 6, and thereafter, is filtered by the filter device 6 thereby to be cleaned working fluid which is then supplied to the cleaned fluid tank 1. Further, some of the cleaned working fluid stored in the cleaned fluid tank 1 is cooled by a working fluid cooling device 4 and supplied to the polluted fluid tank 2.

A wire electric discharge machine 20 includes upper and lower wire guides 11 disposed opposite to each other, and a wire electrode (not shown) extending between the upper and lower wire guides 11, and can machine a workpiece by the electric discharge generated between the wire electrode and the workpiece. During the electric discharge machining, a working fluid supply pump 8 is actuated to supply the cleaned working fluid from the cleaned fluid tank 1 to the upper and lower wire guides 11 and to eject the working fluid to a machining area. The working fluid ejected to the machining area is collected into a machining tank 3 and delivered therefrom to the polluted fluid tank 2. In a case of a dipping machining (wherein the machining is carried out in the working fluid stored in the machining tank 3), as it is necessary to store the working fluid in the machining tank 3 during the machining, there is provided a supplementary working fluid supply pump 9, which is always actuated during the machining to supply the working fluid in the cleaned fluid tank 1 to the machining tank 3. In addition, there is provided a working fluid storage pump 10 for storing the working fluid in the machining tank, so that the working fluid storage pump 10 is actuated to supply the cleaned working fluid from the cleaned fluid tank 1 to the machining tank 3 for the purpose of the dipping machining.

The fluid level of the working fluid in the cleaned fluid tank 1 is detected by the fluid level detecting device 5, and the output thereof is sent to a control unit 12. The control unit 12 issues a discharge rate command to a filter device pump controller 13 for controlling the operation of the filter device pump 7, based on the detected fluid level. Based on this discharge rate command, the pump controller 13 controls the discharge rate of the filter device pump 7 by means of the inverter control or the like.

Figure 2:
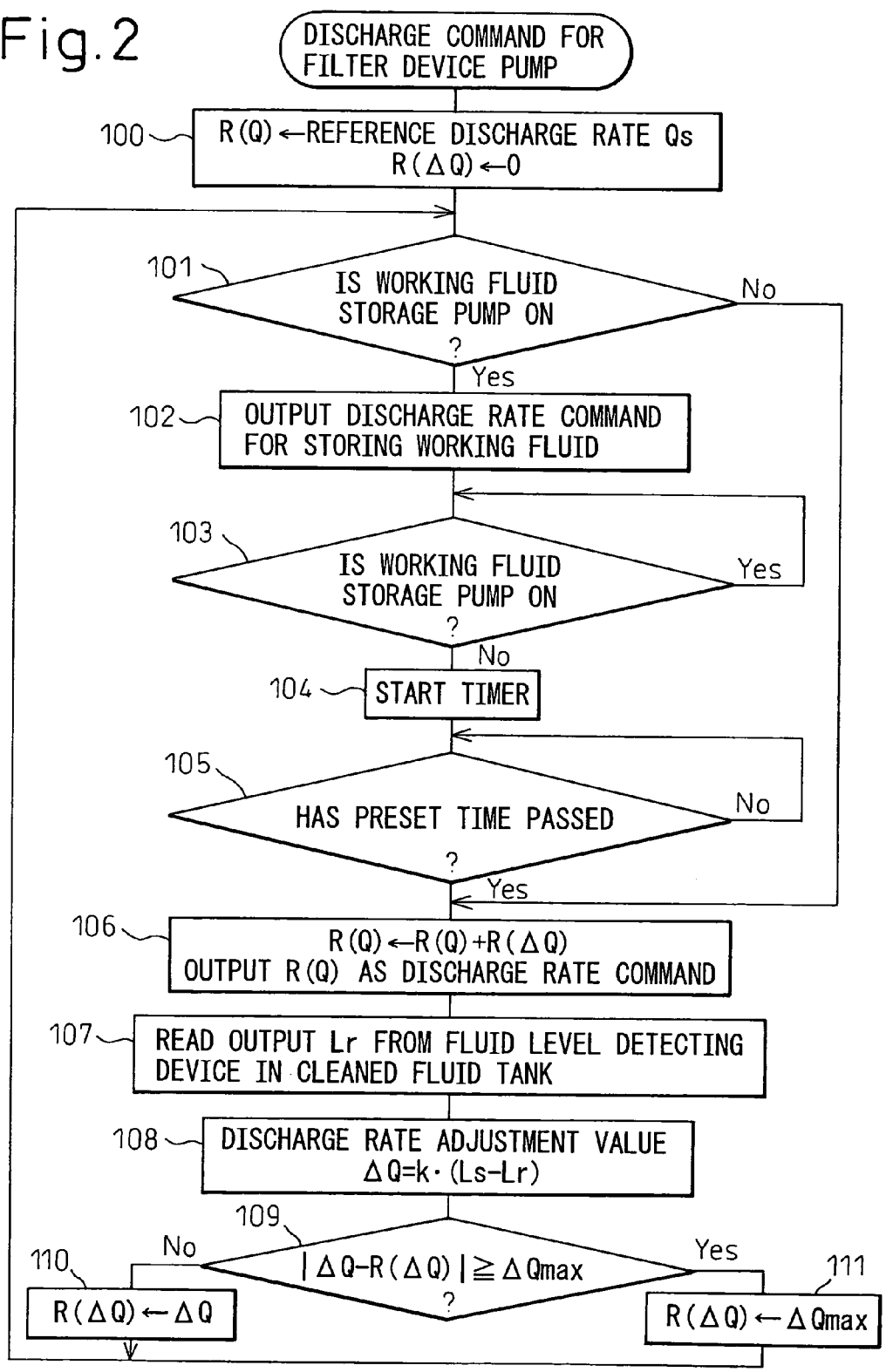
FIG. 2 is a flow chart illustrating a control procedure for a filter device pump in the first embodiment.

FIG. 2 is a flow chart illustrating a control procedure for a filter device pump 7 which is carried out by the control unit 12.

When a command is input to the filter device pump 7, a processor of the control unit 12 firstly stores a predetermined reference discharge rate Qs in a discharge rate command register R(Q) for storing the command of the discharge rate Q therein and then sets "0" in a discharge rate adjustment value storage register R(ΔQ) for storing a discharge rate adjustment value ΔQ therein (step 100). It is then determined whether or not the working fluid storage pump 10 is "ON" (step 101). If it is not "ON" (if it is OFF), the procedure proceeds to step 106, at which a new value obtained by adding the discharge rate adjustment value ΔQ stored in the discharge rate adjustment value storage register R(ΔQ) to the value stored in the discharge rate command register R(Q) is renewedly stored in the discharge rate command register R(Q), so that the discharge rate command is renewed. Next, the renewed discharge rate Q stored in the discharge rate command register R(Q) is output, as a discharge rate command, to the filter device pump controller 13 (step 106). The pump controller 13 receives this discharge rate command and controls the operation of the filter device pump 7 to make the discharge rate thereof at the commanded value.

Then, an output Lr from the fluid level detecting device 5 for detecting the fluid level in the cleaned fluid tank 1 is read (step 107), and a discharge rate adjustment value ΔQ is obtained by subtracting the detected value Lr from a predetermined reference fluid level Ls and multiplying the resultant value by a coefficient k (step 108). In this regard, the coefficient k is determined depending on the horizontal cross-sectional area of the cleaned fluid tank 1, so that the discharge rate adjustment value ΔQ is obtained depending on a difference between the reference fluid level Ls and the detected fluid level Lr and a size of the cleaned fluid tank 1. The discharge rate adjustment value ΔQ is a positive value when the detected fluid level Lr is lower than the reference fluid level Ls, while it is a negative value when the detected fluid level Lr is higher than the reference fluid level Ls.

Next, it is determined whether or not an absolute value of the difference between the discharge rate adjustment value ΔQ obtained at step 108 and the preceding discharge rate adjustment value ΔQ stored in the discharge rate adjustment value storage register R(ΔQ) is equal to or more than a predefined maximum value ΔQmax (step 109). If the absolute value is not equal to or more than the predefined maximum value ΔQmax (if it is smaller than the predefined maximum value ΔQmax), the discharge rate adjustment value ΔQ obtained at step 108 is stored in the discharge rate adjustment value storage register R(ΔQ) (step 110). On the other hand, if the absolute value is equal to or more than the predefined maximum value ΔQmax, the predefined maximum value ΔQmax is stored in the discharge rate adjustment value storage register R(ΔQ) (step 111). Thereafter, the procedure returns to step 101.

Subsequently, unless the working fluid storage pump 10 is switched into "ON", steps 101 and 106 to 111 are repeated at predetermined intervals. When the detected fluid level Lr is lower than the reference fluid level Ls, the discharge rate adjustment value ΔQ is a positive value, and the discharge rate command for the filter device pump is renewed to be one larger than the discharge rate command at that time, so that an amount of the cleaned working fluid supplied by the filter device pump 7 from the polluted fluid tank 2 through the filter device 6 to the cleaned fluid tank 1 increases. On the other hand, when the detected fluid level Lr is higher than the reference fluid level LS, the discharge rate adjustment value ΔQ is a negative value, and the discharge rate command for the filter device pump 7 is renewed to be one smaller than the discharge rate command at that time, so that an amount of the cleaned working fluid supplied by the filter device pump 7 from the polluted fluid tank 2 through the filter device 6 to the cleaned fluid tank 1 decreases.

Although the discharge rate command for the filter device pump 7 is controlled in response to the detected fluid level in the cleaned fluid tank 1, as described above, an amount of the cleaned working fluid discharged from the filter device 6 into the cleaned fluid tank 1 varies in response to the degree of the clogging of the filter paper (or the filtering member) in the filter device 6 even if the same discharge rate command is issued. However, the discharge rate command Q increases until the fluid level in the cleaned fluid tank 1 reaches the reference fluid level Lr; and when the fluid level reaches the reference fluid level Lr, the discharge rate adjustment value $\Delta Q$ becomes "0" and the discharge rate command Q is maintained at the discharge rate command at that time. If the fluid level in the cleaned fluid tank 6 changes due to the progression of the clogging of the filter and the resultant decrease of the flow rate of the working fluid discharged from the filter device 6 into the cleaned fluid tank 1, or the like, the discharge rate adjustment value $\Delta Q$ is determined in response to the change and the discharge rate command Q is renewed so that the fluid level in the cleaned fluid tank 1 is controlled to coincide with the reference fluid level Lr.

Further, according to this embodiment, the difference between the discharge rate adjustment value $\Delta Q$ in the present cycle and that in the preceding cycle is obtained by the procedure at steps 109 to 111, and if the difference is equal to or more than a predetermined value $\Delta Q$max, this value $\Delta Q$max is set as the discharge rate adjustment value $\Delta Q$ in the present cycle so that the increase in the discharge rate command is limited to be equal to or less than the predetermined value $\Delta Q$max. Since an abrupt change in the discharge rate command is thereby suppressed, it is possible to prevent the filtering member (for example, the filter paper) of the filter device 6 from being clogged due to the abrupt change in the flow rate of the working fluid, or to prevent the sludge or wire waste from, instead of depositing on the mesh surface of the filtering member at a suitable interval, depositing on the mesh surface in a dense state so as to stick to it.

On the other hand, when the working fluid storage pump 10 is switched into "ON", the working fluid in the cleaned fluid tank 1 is rapidly pumped up by the working fluid storage pump 10 and supplied to the machining tank 3, so that the fluid level in the cleaned fluid tank 1 rapidly is lowered. Accordingly, in this embodiment, when the "ON" state of the working fluid storage pump 10 is detected at step 101, the discharge rate command for storing a predetermined amount of working fluid is issued to the filter device pump controller 13 (step 102). It is then determined whether or not the working fluid storage pump 10 is "ON" (step 103). If the working fluid storage pump 10 is "OFF", a timer is made to start after being reset (step 104). When the preset time passes over (step 105), the procedure proceeds to step 106 at which the normal procedure described above is carried out.

While a swing arm type of fluid level detecting device is shown in this first embodiment as an example of the fluid level detecting device 5, other types of fluid level detecting device may be used for the same purpose. For example, a type of fluid level detecting device as shown in FIG. 6 may be used, in which a hydraulic pressure sensor 5' is used for detecting the pressure of the working fluid and the fluid level is determined based on the detected pressure of the working fluid. Alternatively, a type of fluid level detecting device may be used, in which a plurality of float switches are used for detecting stepwise the fluid level.

Figures 3, 4:
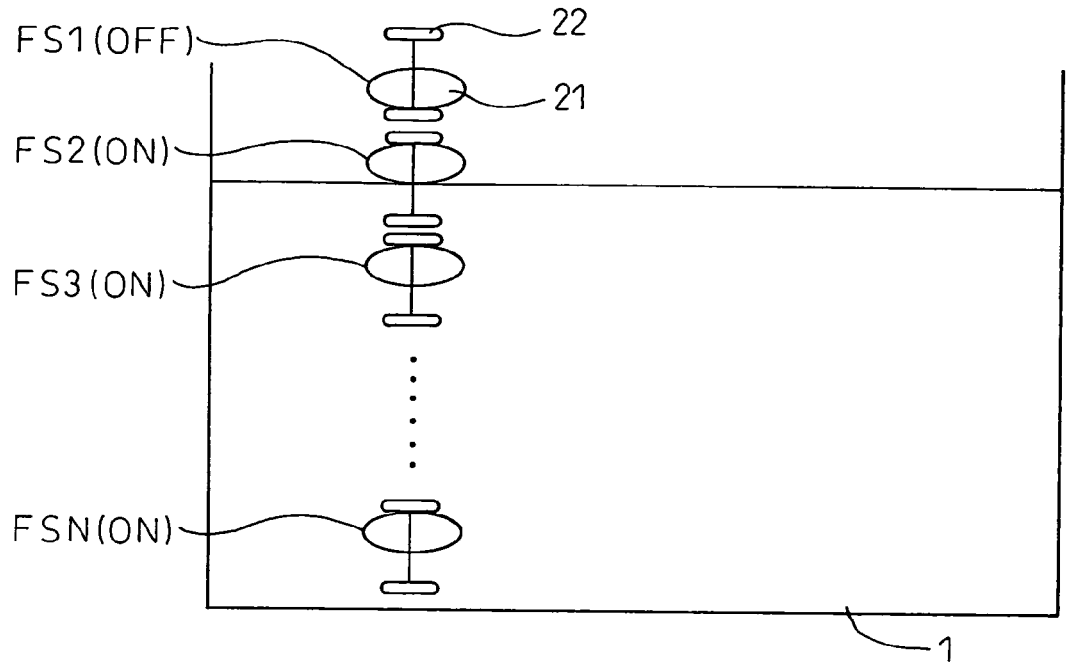
FIG. 3 is a schematic view illustrating a fluid level detecting device able to be used in a second embodiment of the present invention, in which a plurality of float switches are used for detecting the fluid level.
FIG. 4 is an illustrative view of a table in which the respective discharge rate adjustment values corresponding to the respective float switches in the second embodiment are stored.

FIG. 3 is a schematic view illustrating the above-mentioned fluid level detecting device, in which a plurality of float switches are used for detecting stepwise the fluid level, and an example will be described below as a second embodiment in which the type of fluid level detecting device as shown in FIG. 3 is used instead of the fluid level detecting device shown in FIG. 1.

In FIG. 3, N float switches FS1 to FSN are disposed at different depth positions in the cleaned fluid tank 1, and float switch numbers 1 to N are added to the respective float switches FS so that one disposed at the highest position is indicated by FS1 and one disposed at the lowest position is indicated by FSN. Each of the respective float switches FS1 to FSN has a float 21 adapted to float in the working fluid and a contact 22 adapted to output an ON signal when the float 21 is risen by the working fluid and reaches the upper movement limit.

On the other hand, as shown in FIG. 4, in a memory of the control unit 12, a table is prepared in which the respective discharge rate adjustment values $\Delta Q_i$ are predefined and stored corresponding to the respective float switch numbers. Further, a discharge rate adjustment value $\Delta Q_{n+1}$, which corresponds to the case in which the lowest float switch FSN is not ON, is predefined and stored corresponding to an imaginary float switch number N+1.

FIG. 5 is a flow chart illustrating a control procedure for a filter device pump in the second embodiment.

Steps 200 to 205 are the same as steps 100 to 105 of the procedure in the first embodiment shown in FIG. 2. In other words, the processor of the control unit 12 sets the predetermined reference discharge rate Qs in the discharge rate command register R(Q) and sets "0" in the discharge rate adjustment value storage register R($\Delta Q$) (step 200). The processor then determines whether or not the working fluid storage pump is "ON" (step 201). If it is "ON", the procedure proceeds to step 206 after the same procedure as steps 102 to 105 is carried out. Contrarily, if the working fluid storage pump is not "ON", the procedure proceeds from step 201 directly to step 206.

At step 206, "1" is set as the float switch number i, and it is determined whether or not the float switch FSi having the float switch number i is "ON" (step 207). If it is not ON, the fluid level switch number i is increased by 1 (step 208). It is then determined whether or not the float switch number i exceeds the number N of the float switches (step 209) and, if not, the procedure returns to step 207. In such a manner, each time the float switch number i is increased by 1, it is determined whether or not the float switch is "ON", in order starting from the float switch for detecting the highest fluid level to one for detecting the lowest fluid level. When the float switch FSi which is in "ON" state is detected, the discharge rate adjustment value $\Delta Q_i$ corresponding to the float switch number i of that float switch FSi is read from the table stored in the memory (step 210).

Then, it is determined whether or not the absolute value of the difference between the discharge rate adjustment value $\Delta Qi$ thus read and the preceding discharge rate adjustment value $\Delta Q$ stored in the discharge rate adjustment value storage register R($\Delta Q$) is equal to or more than the predetermined maximum value $\Delta Q$max (step 211). If it is not equal to or more than the predetermined maximum value $\Delta Q$max (or it is less than the predetermined maximum value $\Delta Q$max), the discharge rate adjustment value $\Delta Qi$ obtained at step 210 is stored in the discharge rate adjustment value storage register R($\Delta Q$) (step 212). On the other hand, if the absolute value is equal to or more than the predetermined maximum value $\Delta Q$max, the predetermined maximum value ΔQmax is stored in the discharge rate adjustment value storage register R(ΔQ) (step 213). Next, a new value obtained by adding the discharge rate adjustment value ΔQ stored in the discharge rate adjustment storage register R(ΔQ) to the value stored in the discharge rate command register R(Q) is stored in the discharge rate command register R(Q), so that the discharge rate command is renewed. The renewed discharge rate Q stored in the discharge rate command register R(Q) is output, as a discharge rate command, to the filter device pump controller 13 (step 214). The pump controller 13 receives this discharge rate command and controls the operation of the filter device pump 7 to make the discharge rate thereof at the commanded value.

Thereafter, the procedure returns to step 201. Subsequently, the procedure defined at steps 201 to 214 are repeated at predetermined intervals.

Although the present invention has been described based on the preferred embodiments shown in the accompanying drawings, these embodiments are solely illustrative but not limitative. Accordingly, the scope of the present invention is limited solely by appending claims, and the embodiments may be modified or changed without departing from the scope of the claims. For example, while the example in which the inventive device for treating working fluid is applied to a wire electric discharge machine has been described in the above embodiments, it could be applied to another kind of electric discharge machine such as a die-sinking electric discharge machine.

What is claimed is:

1. A device for treating working fluid for electric discharge machining, in which a workpiece is machined by applying electric voltage between an electrode and the workpiece to generate electric discharge between the electrode and the workpiece, said device comprising a polluted fluid tank for collecting and storing the polluted working fluid used in the machining, a cleaned fluid tank for storing cleaned working fluid obtained by delivering the polluted working fluid from said polluted fluid tank to a filter device by means of a filter device pump and filtering the polluted working fluid, a working fluid supply pump for supplying the cleaned working fluid from said cleaned fluid tank to an electric discharge machining area during the machining, and a pump controller for controlling a discharge rate of said filter device pump, wherein said device further comprises fluid level detecting means for detecting a fluid level of the cleaned working fluid in said cleaned fluid tank, and a control unit for determining a discharge rate command for the filter device pump, based on the fluid level detected by said fluid level detecting means, said control unit outputting the determined discharge rate command to said pump controller, said pump controller controlling said filter device pump, based on the discharge rate command, to transfer the working fluid from said polluted fluid tank to said cleaned fluid tank through said filter device.

2. The device according to claim 1, wherein said fluid level detecting means comprises a swing arm type of float switch.

3. The device according to claim 1, wherein said fluid level detecting means comprises a hydraulic pressure sensor and means for detecting a fluid level by converting a hydraulic pressure sensed by said hydraulic pressure sensor into a corresponding fluid level.

4. The device according to claim 1, wherein said control unit operates to determine a discharge rate adjustment value, based on a difference between a predetermined reference fluid level and the fluid level detected by said fluid level detecting means, and to output a discharge rate command obtained by adding the determined discharge rate adjustment value to the discharge rate command at that time, as a renewed discharge rate command, to said pump controller.

5. The device according to claim 2, wherein said control unit operates to determine a discharge rate adjustment value, based on a difference between a predetermined reference fluid level and the fluid level detected by said fluid level detecting means, and to output a discharge rate command obtained by adding the determined discharge rate adjustment value to the discharge rate command at that time, as a renewed discharge rate command, to said pump controller.

6. The device according to claim 3, wherein said control unit operates to determine a discharge rate adjustment value, based on a difference between a predetermined reference fluid level and the fluid level detected by said fluid level detecting means, and to output a discharge rate command obtained by adding the determined discharge rate adjustment value to the discharge rate command at that time, as a renewed discharge rate command, to said pump controller.

7. The device according to claim 1, wherein said fluid level detecting means comprises a plurality of float switches disposed at different depth positions in said cleaned fluid tank so as to be capable of detecting stepwise a fluid level, and wherein said control unit operates to determine the discharge rate command for said filter device pump based on the fluid level detected by said fluid level detecting means.

8. The device according to claim 7, wherein said control unit operates to determine a discharge rate adjustment value corresponding to the detected fluid level by using discharge rate adjustment values, the respective discharge rate adjustment values predefined and stored in advance in correspondence to the respective fluid levels to be detected by the respective float switches, and to output a discharge rate command obtained by adding the determined discharge rate adjustment value to the discharge rate command at that time, as a renewed discharge rate command, to said pump controller.

9. The device according to claim 1, wherein, when the fluid level in said cleaned fluid tank is significantly lowered, said control unit operates to limit an increased amount of the discharge rate command for said filter device to prevent the discharge rate command from abruptly increasing.

10. The device according to claim 1, wherein said electric discharge machine comprises a wire electric discharge machine.

* * * * *